H. O. HEM.
WEIGHING SCALE.
APPLICATION FILED DEC. 27, 1920.
1,437,517.
Patented Dec. 5, 1922.
2 SHEETS—SHEET 1.
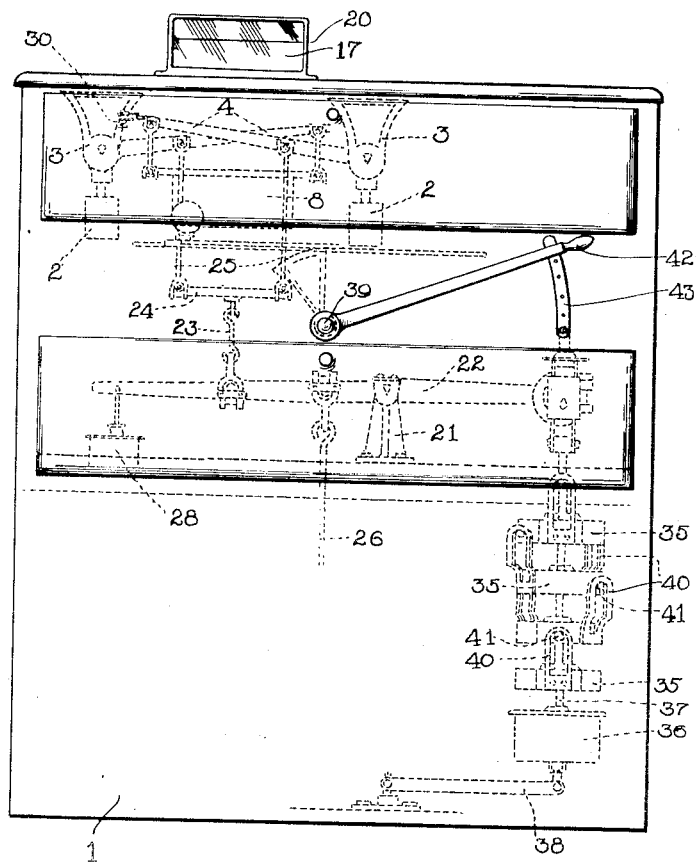
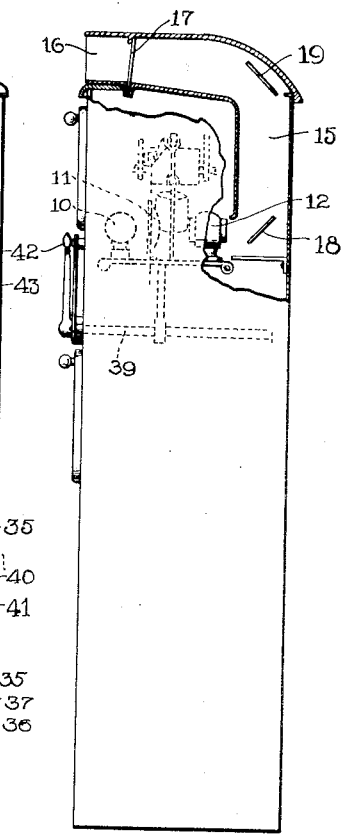
Inventor
HALVOR O. HEM.

H. O. HEM.
WEIGHING SCALE.
APPLICATION FILED DEC. 27, 1920.
1,437,517.
Patented Dec. 5, 1922.
2 SHEETS—SHEET 2.
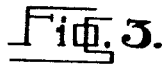
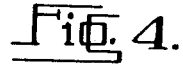
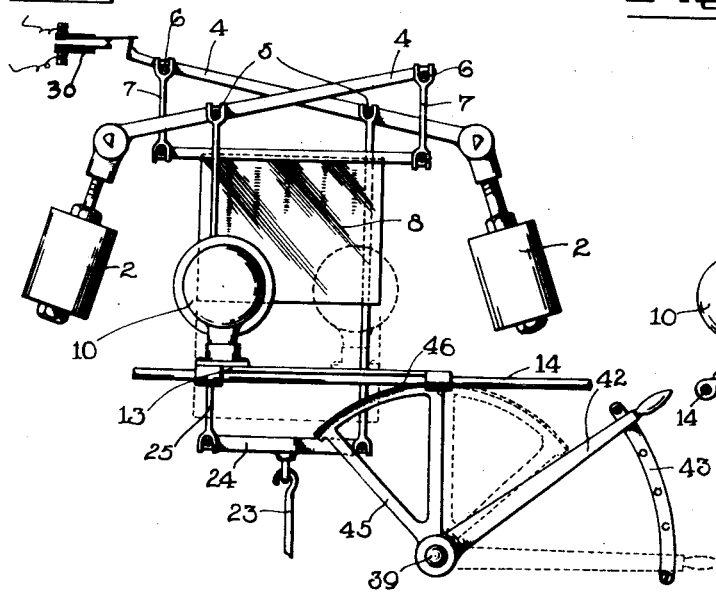
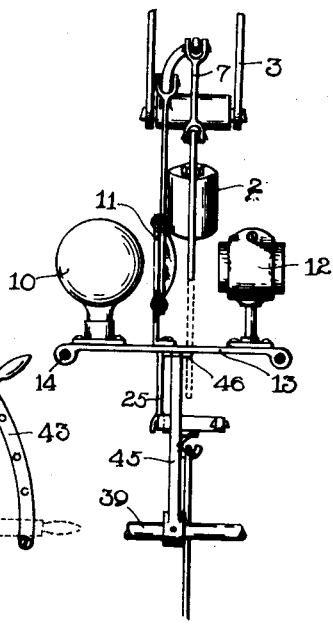
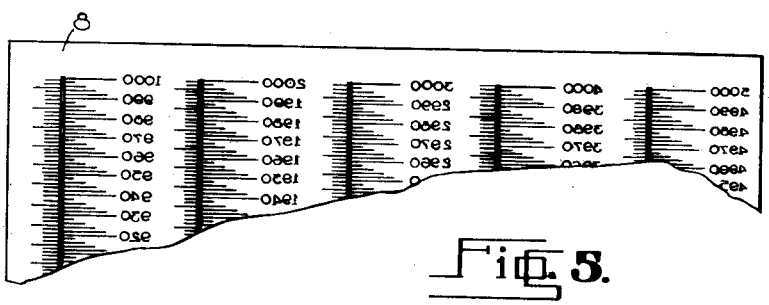
Inventor
HALVOR O. HEM.
By CO Marshall Attorney
Witness
C. C. Hiley Patented Dec. 5, 1922.

1,437,517

UNITED STATES PATENT OFFICE.

HALVOR O. HEM, OF TOLEDO, OHIO, ASSIGNOR TO TOLEDO SCALE COMPANY, OF TOLEDO, OHIO, A CORPORATION OF NEW JERSEY.

WEIGHING SCALE.

Application filed December 27, 1920. Serial No. 433,505.

*To all whom it may concern:*

Be it known that I, HALVOR O. HEM, a citizen of the United States, residing at Toledo, in the county of Lucas and State of Ohio, have invented certain new and useful Improvements in Weighing Scales, of which the following is a specification.

This invention relates to weighing scales, and particularly to scales such as are used in industrial establishments for weighing comparatively heavy loads.

One of its principal objects is to simplify the weighing and indicating mechanism of scales of this class.

Another object is to combine automatic and beam weighing mechanism with improved means for indicating weights offset by the automatic mechanism alone or weights offset by the automatic and beam mechanisms acting together.

Other objects and advantages will be apparent from the following description, in which reference is had to the accompanying drawings illustrating a preferred embodiment of my invention and wherein similar reference numerals designate similar parts throughout the several views.

In the drawings:—

Figure 1 is a front elevation of a portion of a scale embodying my invention;

Figure 2 is a side elevation thereof, parts being broken away;

Figure 3 is an enlarged fragmentary front elevation of the automatic weighing and indicating mechanism;

Figure 4 is a side elevation thereof; and

Figure 5 is a still further enlarged fragmentary front elevation of the chart.

In the drawings I have illustrated an embodiment in which pendulum mechanism and unit weights are employed to counterbalance the load. It is to be understood, however, that the use of other automatic weighing mechanism, such, for example, as springs, and other beam weighing mechanism is within the scope of the invention in its broader aspect.

I have illustrated only the cabinet 1 and the parts contained therein, since the base and platform lever mechanism may be of any desired type. The scale as illustrated is provided with pendulum load-offsetting mechanism consisting of a pair of oppositely-swinging pendulums 2 supported by brackets 3 secured within the cabinet 1.

Each pendulum 2 is provided with a long arm 4 which carries two pivots, the pivots 5 nearest the pendulum fulcrums being connected through mechanism hereinafter to be described to the platform lever mechanism, while the pivots 6 remote from the pendulum fulcrums are connected by means of links 7 to a chart 8. Owing to this arrangement, vertical movement of the chart 8 during a weighing operation is comparatively great.

The chart 8 is of transparent or translucent material and bears a plurality of columns of weight graduations. In the sample chart shown in Figure 5, the graduations in the column at the left are adapted to indicate weights ranging from 1 to 1000 lbs., the second column being marked to indicate weights from 1000 to 2000 lbs., the third column to indicate weights from 2000 to 3000 lbs., the fourth from 3000 to 4000 lbs., and the fifth 4000 to 5000 lbs. Each column may, of course, indicate greater or lesser weight capacity, as desired.

A projecting apparatus comprising a lamp 10, condenser 11, and objective 12 is carried upon a frame 13 slidably mounted upon a pair of rods 14 and normally so positioned as to project the graduations in the first column.

An enclosed passage 15 extends from adjacent the objective 12 to the top of the cabinet 1 and thence forwardly to the front of the cabinet, terminating in a shadow box 16, at the rear end of which is a ground glass screen 17. Mirrors 18 and 19 located respectively at the lower end and at the turn of the passage 15 serve to direct the rays of light so that the reversed image of a portion of the chart falls upon the screen, on which is a reading line 20.

Fulcrumed upon a bracket 21 within the cabinet 1 is a lever 22 which is operatively connected to the pivots 5 of the arms 4 by means of a link 23, equalizer 24, and a pair of tension rods 25. The lever 22 is connected to the platform levers (not shown) by means of a steelyard 26, and is also connected to a dash pot 28 which serves to damp the movement of the weighing mechanism.

The scale is sealed with the zero graduation of the chart 8 in position to be projected into coincidence with the reading line 20 of the screen when there is no load upon the platform. When a load is placed upon the platform of the scale, the pendulums swing outwardly and upwardly until the load is offset. As the pendulums swing, the chart moves downwardly, bringing other graduations into projecting position, the graduations being so spaced that when the scale comes to rest in weighing position the graduation corresponding to the weight of the load will be in position to be projected. A self-closing switch 30, one member of which is resilient, is mounted upon one of the brackets 3, with its resilient member in the path of the opposite arm 4, so that the switch is open when the weighing mechanism is returned to zero position and automatically closes when the weighing mechanism moves away from zero position. This switch is in circuit with the lamp 10. When, therefore, the scale is under no load, the lamp is unlighted. As soon, however, as a load is placed upon the scale, the chart is illuminated, so that the proper graduation may be projected upon the screen 17.

The mechanism so far described is capable of weighing any load within the capacity of the pendulum weighing mechanism. For the purpose of counterbalancing loads in excess of the capacity of the automatic weighing mechanism I have provided a chain of unit weights 35 adapted to be placed upon a poise pan 36 which is hung from the end of the lever 22. The lever 22 may be equipped with a tare beam, and the unit weight supporting and manipulating mechanism is generally of the type shown and described in detail in my co-pending application, Ser. No. 96,511, filed May 10, 1916. The poise pan is supported by a rod 37 depending from a knife-edge pivot on the lever 22, and is prevented from swinging by a check link 38. The poises 35 are supported from an arm (not shown) fixed to a rock shaft 39 which is journaled in the front and rear walls of the cabinet 1, the poises being attached together by means of loops 40 and pins 41 and thus forming a chain.

The rock shaft 39 is controlled by a handle 42 fixed to the end of the shaft 39 which extends through the front wall of the cabinet. When this handle is moved downwardly from the position in which it is shown in Figure 1, the chain of weights descends until the lowermost weight rests upon the poise pan, the pin 41 on the second pan is disengaged from the top of the loop, and the weight of the lowermost poise is supported by the lever 22 in opposition to the load on the scale platform. If the handle be moved further, the second poise is deposited upon the first, the third on the second, and the fourth upon the third. An arcuate locking strip 43 secured to the front of the cabinet is provided with a series of holes to selectively receive a pin carried by the handle 42 and thus retain the handle in position to support all or any desired part of the unit weights 35.

Fixed to the rock shaft 39 is a toothed sector 45 which meshes with a rack 46 secured to the sliding frame 13 which supports the projecting apparatus, so that when the shaft 39 is turned to lower or raise the weights the frame is shifted laterally. The parts are so proportioned that when the shaft and the parts fixed thereto are in position to hold all of the weights 35 off the pan 36, the projecting apparatus is in position to project an indication from the column of graduations at the left of the chart, and when the handle 42 is lowered sufficiently to deposit the first or lowermost weight 35 upon the pan 36, the projecting apparatus is moved into position to project an indication from the next (or 1000 to 2000 lb.) column. If, when the unit weight is on the pan, the load on the platform be less than 1000 lbs. in weight, the pendulums will remain in zero position and the lamp 10 will not be lighted, so that there will be no image on the ground glass screen 17. If the load on the platform be between 1000 and 2000 lbs. in weight, 1000 lbs. of the load will be counterbalanced by the unit weight 35 and the remainder will be offset by the pendulums, the lamp will be lighted, and the total weight of the load will be projected from the second column of the chart onto the screen. If the weight of the load exceed 2000 lbs., the chart will move downwardly until the 2000 lb. mark has passed the principal axis of the projector, and the screen at the reading line, though illuminated, will be blank, thus indicating that one or more additional unit weights are necessary to counterbalance the load. In general, when the screen is dark, some of the unit weights must be removed from the beam, and when it is illuminated but blank, unit weights must be added.

While it will be apparent that the illustrated embodiment of my invention herein disclosed is well calculated to adequately fulfill the objects primarily stated, it is to be understood that my invention is susceptible to variation, modification and change within the spirit and scope of the subjoined claims.

Having described my invention, I claim:

1. In a weighing scale, in combination, a chart having successive series of graduations, and means for selectively projecting graduations from each of said series.

2. In a weighing scale, in combination, beam weighing mechanism for offsetting a portion of the load, automatic weighing mechanism for offsetting the remainder of such load, a chart having successive series of graduations, means for selecting a series of graduations according to the portion of the load offset by said beam weighing mechanism, means for projecting an indication from said chart, and means controlled by said automatic weighing mechanism for selecting the graduation to be so projected.

3. In a weighing scale, in combination, automatic load-offsetting mechanism, a beam connected thereto, a unit weight, means for placing said unit weight upon said beam, a chart having a series of graduations representing weights to be offset by said automatic mechanism, a series of graduations representing weights to be offset by said automatic mechanism and said unit weight acting in conjunction, and means for projecting an indication from either series of graduations.

4. In a weighing scale, in combination, automatic weighing mechanism, a beam, a unit weight, means for applying said unit weight to said beam, a chart having a series of graduations corresponding to weights within the capacity of said automatic mechanism and a series of graduations corresponding to weights to be offset by said unit weight and said automatic mechanism acting together, and means for displaying a proper graduation from the first said series when the unit weight is off the beam and a proper graduation from the second said series when said unit weight is on the beam.

5. In a weighing scale, in combination, automatic weighing mechanism, counterpoise weighing mechanism, a chart connected to said automatic weighing mechanism, counterpoise manipulating mechanism, and a projector connected to said manipulating mechanism to be positioned before said chart in accordance with the position of said counterpoise weighing mechanism.

6. In a weighing scale, in combination, automatic weighing mechanism, counterpoise weighing mechanism, a chart connected to said automatic weighing mechanism, said chart having a plurality of series of graduations, counterpoise manipulating mechanism, and a projector connected to said manipulating mechanism to be positioned before one of the series of graduations of said chart in accordance with the position of said counterpoise weighing mechanism.

7. In a weighing scale, in combination, automatic weighing mechanism, a beam connected thereto, a series of poises, means for placing said poises on said beam, a chart connected to said automatic weighing mechanism, said chart having a plurality of series of graduations, a projector, and means for connecting said projector to said poise-placing means, whereby said projector is moved to co-operate with different series of graduations as each poise is placed upon said beam or removed therefrom.

8. In a weighing scale, in combination, automatic weighing mechanism, a beam connected thereto, a plurality of poises adapted to be placed upon said beam, a chart connected to said automatic weighing mechanism, said chart having a series of graduations representing weights capable of being offset by said automatic weighing mechanism and a series of graduations representing weights capable of being offset by said automatic weighing mechanism and one or more of said poises acting together, a projector, and means connecting said projector and poise-placing means whereby said projector is moved to co-operate with a proper series of graduations as each poise is placed upon said beam or removed therefrom.

9. In a weighing scale, in combination, a pair of pivotally supported pendulums, arms rigid with said pendulums, a chart movably connected to points on said arms, commodity receiver connections intermediate said points and the pivots of said pendulums, and means for projecting indications from said chart.

10. In a weighing scale, in combination, a pair of pivotally supported pendulums, arms rigid with said pendulums, a chart movably connected to points on said arms, commodity-receiver connections intermediate said points and the pivots of said pendulums, said chart having a plurality of series of graduations, and means for projecting indications from a selected series of such graduations.

11. In a weighing scale, in combination, automatic weighing mechanism, a movable chart connected thereto, a projector movable in a direction at right angles to the direction of movement of said chart, poise-manipulating mechanism, and means connecting said projector and poise-manipulating mechanism for simultaneous movement.

HALVOR O. HEM.

Witnesses:
FRANCES DAYLE,
MILDRED ANGELL.